Oct. 18, 1955     R. G. LE TOURNEAU     2,720,896
MOBILE TREE SAW AND PUSHER ARM
Filed Jan. 5, 1953     6 Sheets-Sheet 1
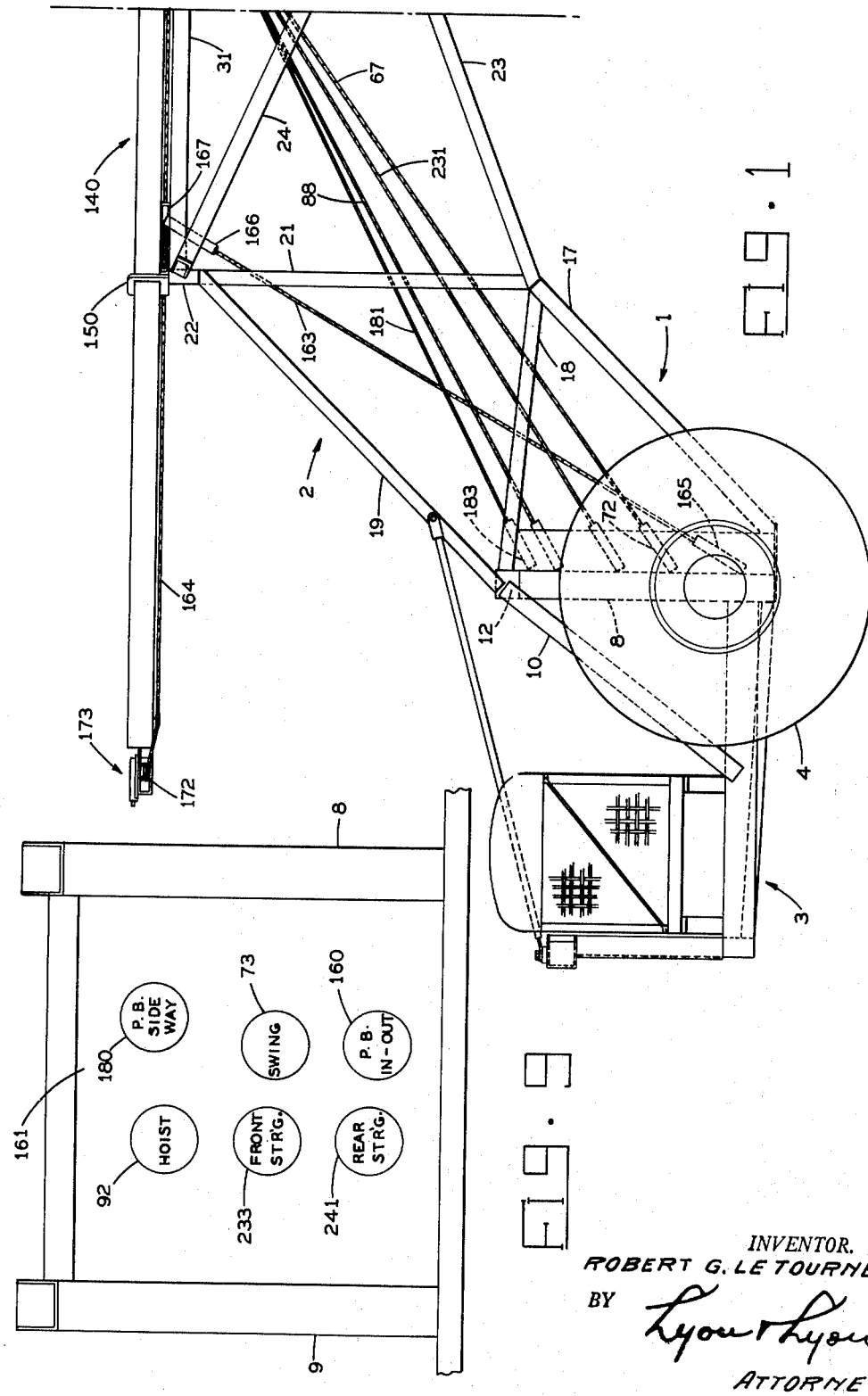
INVENTOR.
ROBERT G. LE TOURNEAU
BY
ATTORNEYS Oct. 18, 1955

R. G. LE TOURNEAU 2,720,896

MOBILE TREE SAW AND PUSHER ARM

Filed Jan. 5, 1953

INVENTOR.
ROBERT G. LE TOURNEAU
BY
ATTORNEYS

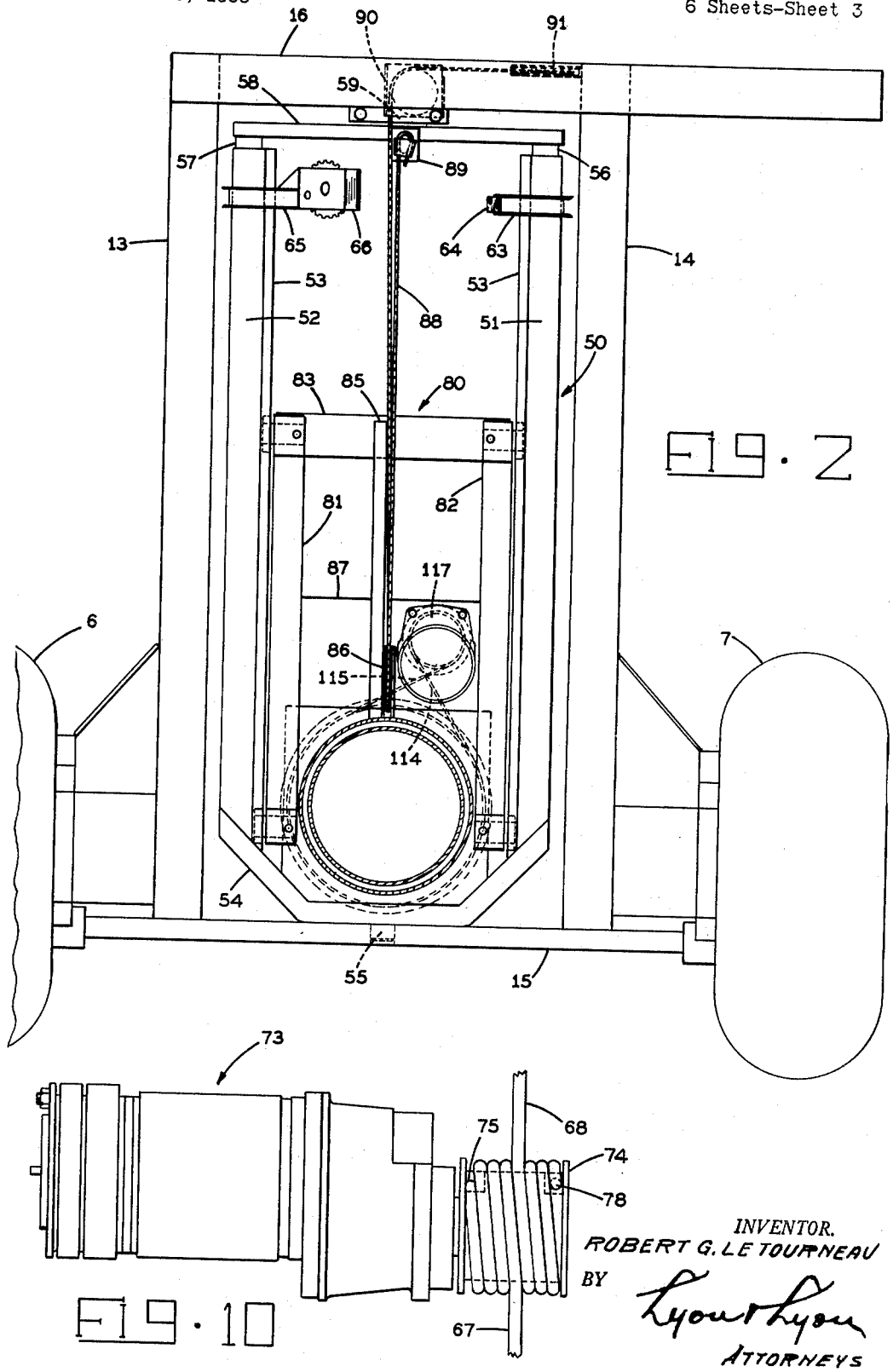

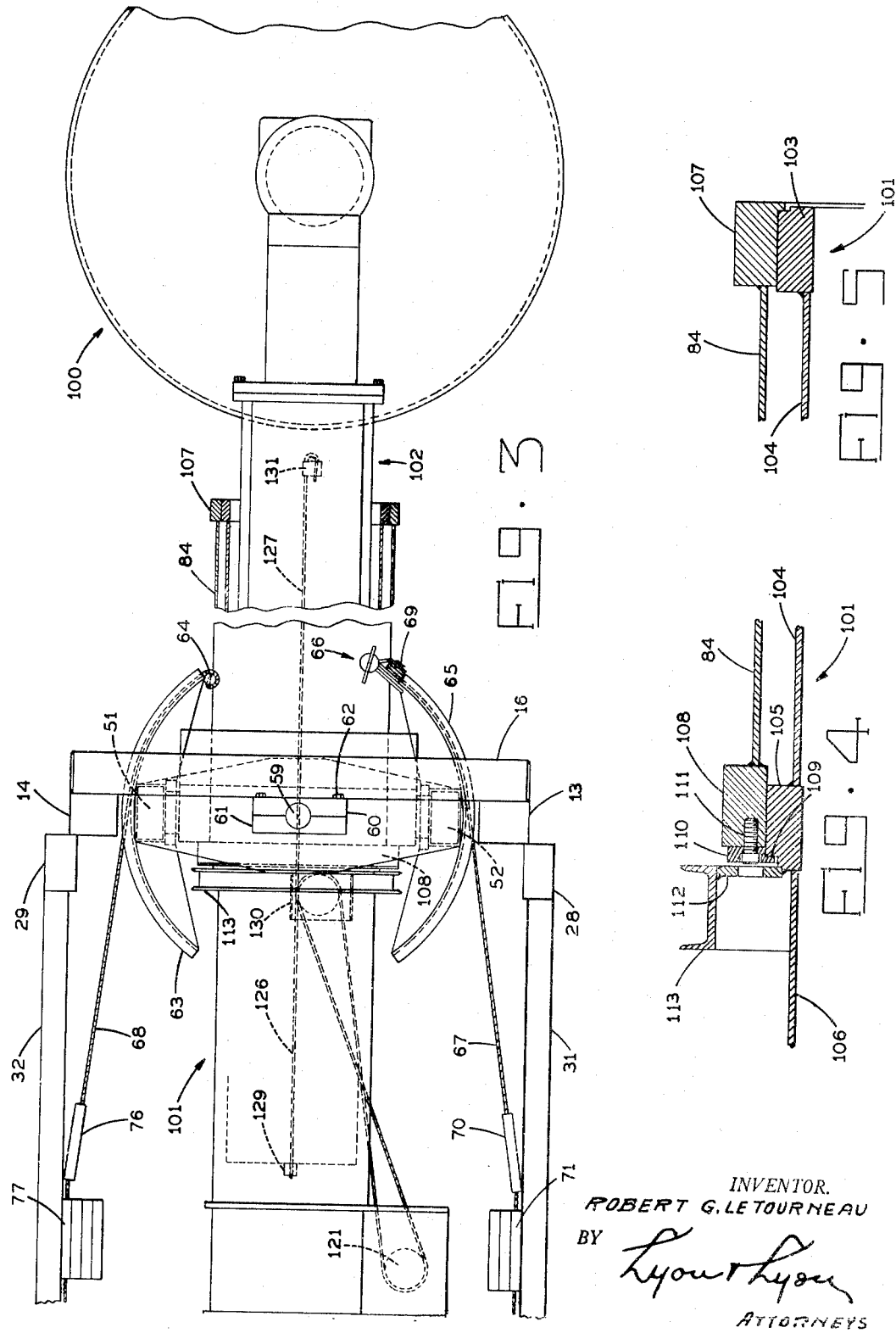

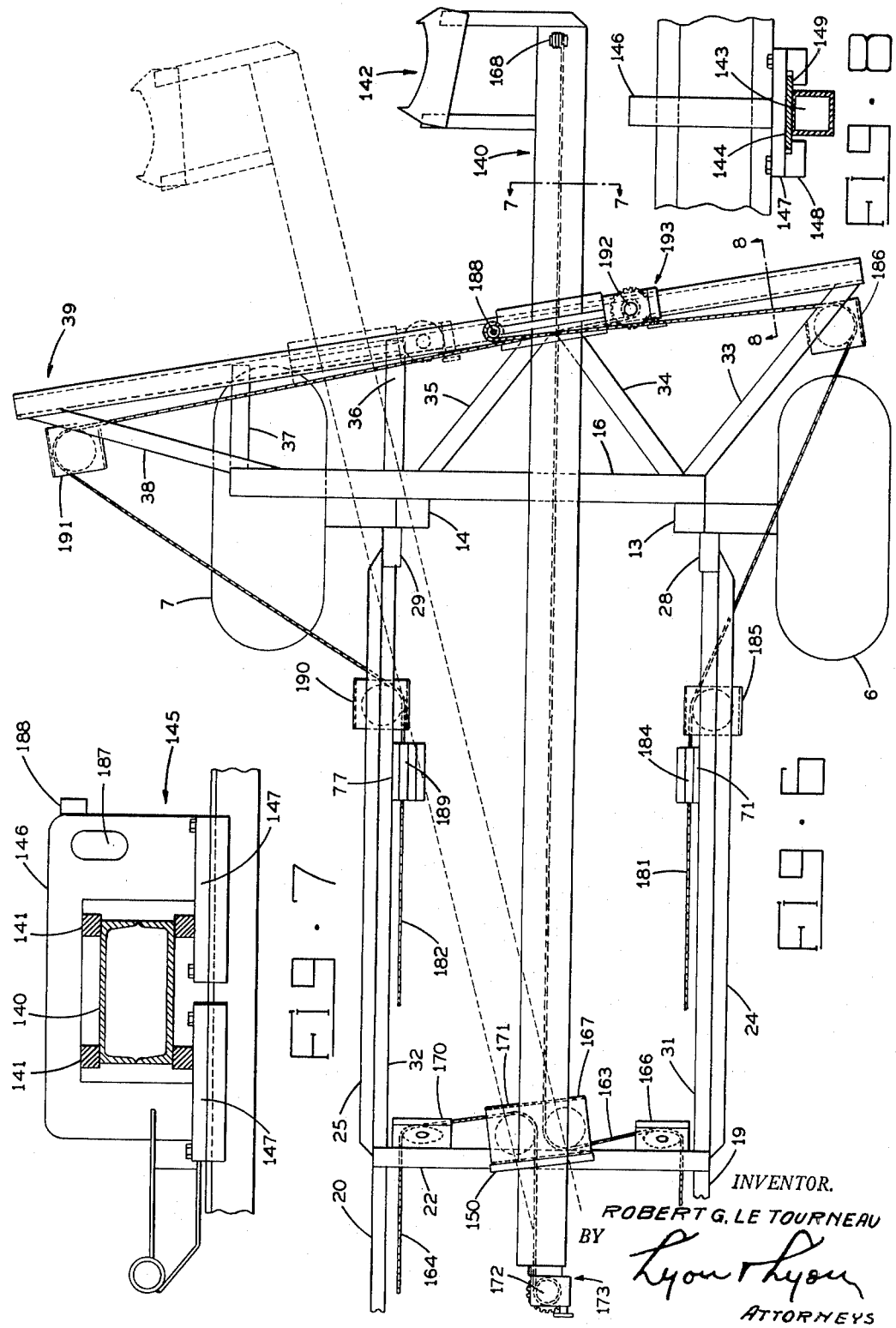

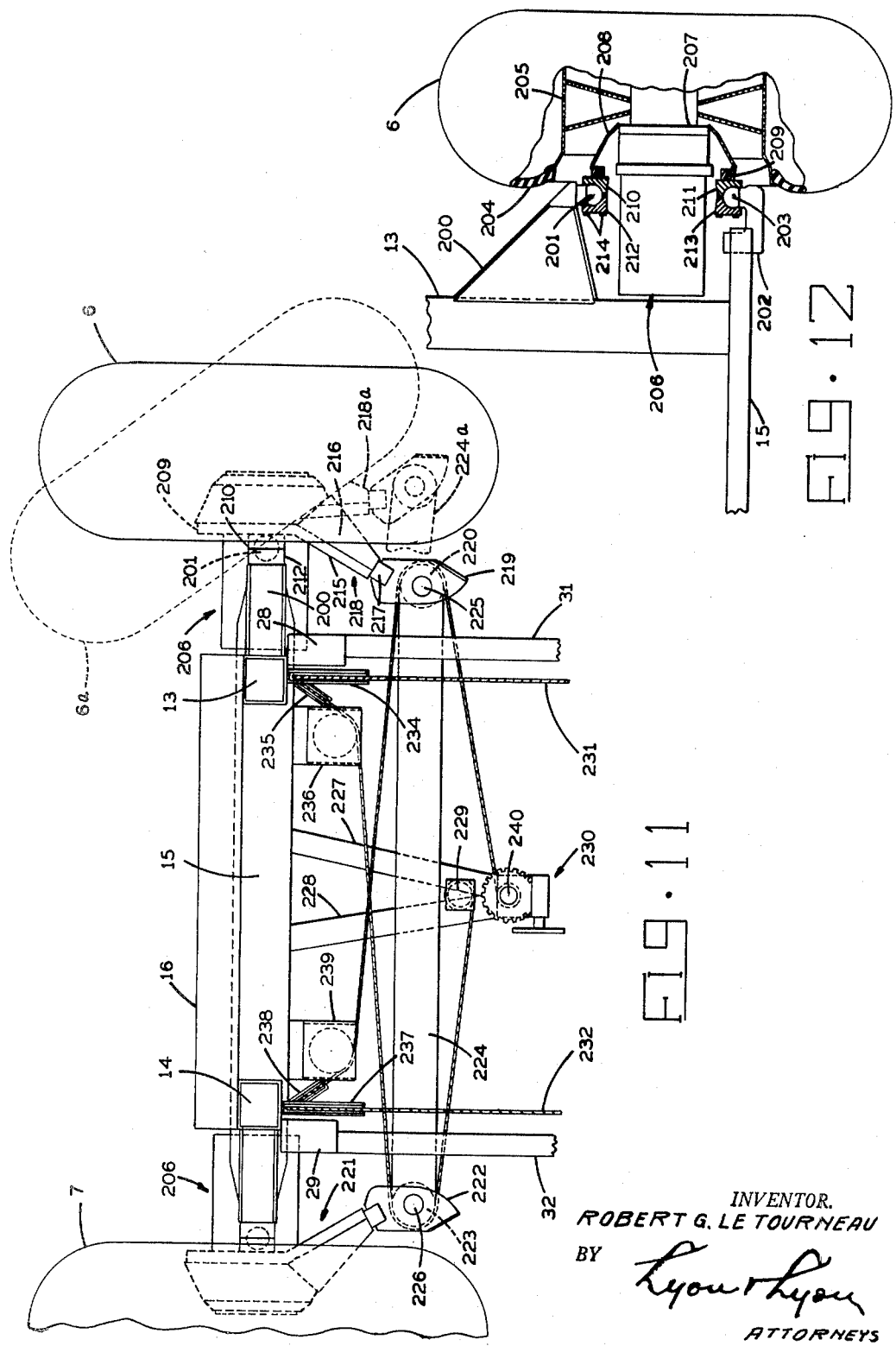

United States Patent Office 2,720,896
Patented Oct. 18, 1955

2,720,896
MOBILE TREE SAW AND PUSHER ARM
Robert G. Le Tourneau, Longview, Tex.
Application January 5, 1953, Serial No. 329,498
4 Claims. (Cl. 143—43)

This invention relates to mobile saws, and more particularly to a mobile tree saw having a power saw mounted for adjustable movement and having an adjustable tree pusher arm for cutting and felling trees.

One of the problems present in tree cutting operations with mobile saws is the difficulty in positioning the saw blade at the exact angle and level desired, particularly when the mobile saw unit is not level.

It is, therefore, an object of my invention to overcome the problem described above by providing a mobile saw having a power saw mounted for movement up and down, right and left, back and forth, and for rotation in a simple yet efficient manner.

Another of the problems encountered in tree saw operations is the danger of accident or injury from falling trees, and the difficulty experienced in controlling the direction of fall of the tree. Previously, this cutting and felling operation has either been haphazardly done, i. e., trees have been cut to fall as they may, or else two separate implements have been employed—one to cut and the other to control the direction of fall.

It is, therefore, another object of my invention to overcome the problem outlined in the paragraph above by providing a mobile tree saw having a tree pusher arm thereon arranged for engaging a tree and pushing it forward, backward or sideways as desired.

Another object of my invention is to provide a mobile saw comprising a rigid body supported by driven wheels, an upstanding elevator frame pivotally mounted on the body for movement about a substantially vertical axis, a carriage mounted in the elevator frame for vertical movement, means for raising and lowering the carriage, a saw boom assembly on the carriage including a power saw, and means for rotating said elevator frame about said axis.

Another object is to provide a mobile tree saw comprising a rigid body supported by driven wheels, a power saw mounted on the body for longitudinal, vertical and transverse movement with respect to the body, a tree pusher arm on the body, and means for moving the arm in all directions horizontally to fell the tree forward, backward or sideways with respect to the body as desired.

These and other objects will become apparent upon perusal of the specification and claims.

In the drawings:

Figs. 1 and 1A taken together show a side elevation of the mobile saw of my invention.

Fig. 2 is a front view partly in section taken along lines 2—2 of Fig. 1A with the upper forwardly extending structure and the tree pusher arm removed.

Fig. 3 is a plan view partly in section of the upper portion of the elevator frame, the main frame, the carriage and the saw boom assembly.

Fig. 4 is an enlarged sectional view of the annular channel and the mounting of the sleeve on the tube of Figs. 3 and 1A.

Fig. 5 is an enlarged sectional view of the tube and sleeve of Figs. 3 and 1A, taken at the saw end of the tube.

Fig. 6 is a fragmentary plan view of the upper portion of the rigid body showing the tree pusher arm and its supports, and also showing the frame members mounted on the wheels.

Fig. 7 is a cross sectional view taken along lines 7—7 of Fig. 6.

Fig. 8 is a cross sectional view taken along lines 8—8 of Fig. 6.

Fig. 9 (sheet 1) is a fragmentary front view showing the motor mount plate and its attachment to the rigid body with the motor driven winches shown schematically.

Fig. 10 (sheet 3) is a side elevation of a representative motor driven winch and the cables winding on the drum.

Fig. 11 (sheet 6) is a view of the wheels and steering arrangement looking from above with part of the main body structure removed.

Fig. 12 is a front view partly in section showing one wheel and its mounting to the rigid body.

Figure 1A:
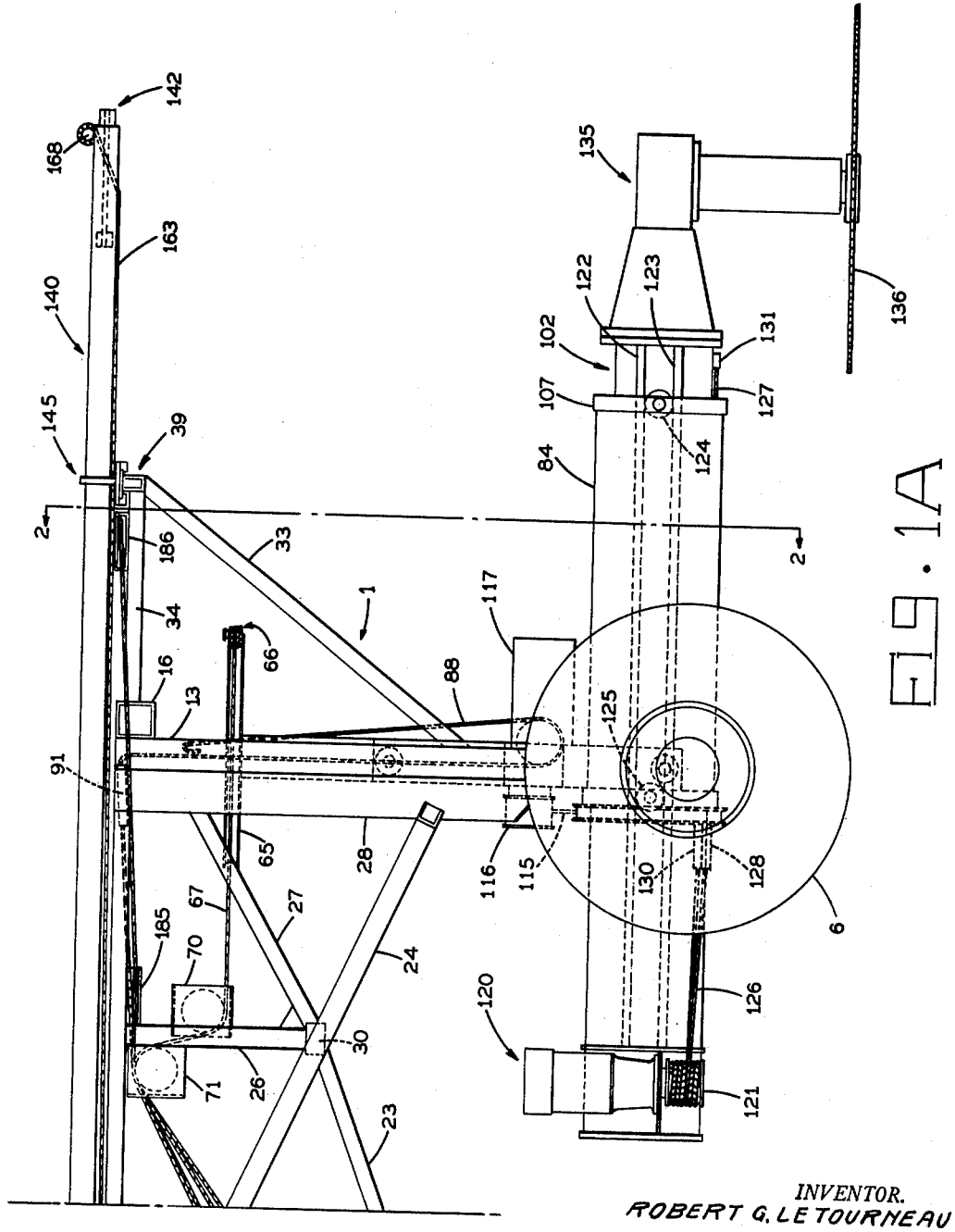

Referring more particularly to the drawings in which a preferred embodiment of applicant's invention is shown, the mobile saw is represented by reference numeral 1 in Fig. 1. This mobile saw comprises a rigid body 2 supported at the forward end by a prime mover 3 and a pair of driven wheels 4, and at the other end by a pair of driven wheels 6 and 7. The rigid body comprises at one end upright beams 8 and 9 braced by brace members 10 and joined by crosspiece 12. At the other end, upright beams 13 and 14 of the rigid body 2 are joined at the bottom by a cross plate 15 and at the top by a cross-beam 16. Between upright beams 8 and 9 and 13 and 14 is part of the rigid body in the form of a truss structure made up of box beams designated by reference numbers 17 thru 30. Also forming part of the rigid body are top beams 31 and 32, and a forwardly extending structure including box beams 33 thru 38 connected to a track 39.

*Elevator frame and carriage*

The elevator frame 50 comprises upstanding beams 51 and 52 (Fig. 2) each having a pair of billets 53 welded thereon to form a track structure on each beam. Beams 51 and 52 have welded at their bottom a wing shaped bar 54 which has a pivot pin 55 welded thereto. Bolt plates 56 and 57 are welded at the top of each upstanding beam and are connected by a pivot plate 58. Pivot plate 58 has a pivot pin 59 welded thereto and together with pivot pin 55 forms a vertical axis about which the elevator frame 50 can pivot. A tapped socket half 60 (Fig. 3) is welded to crossbeam 16 and a cooperating socket half 61 is joined thereto by bolts 62 to surround the pivot pin 59 and journal the elevator frame 50. The lower pivot pin 55 is journalled in the cross plate 15. Beam 51 has welded thereon a cable track 63 having a rod 64 fixed on one end, and serving as a cable deadend. Beam 52 has welded thereon a cable track 65 having a cable tightening mechanism 66 on one end.

Means are provided for rotating the elevator frame about the vertical axis formed by the pivot pins 59 and 55. This means comprises a pair of cables 67 and 68 (Fig. 3), cable 67 being deadended on the rod 69 of tightening mechanism 66. Cable 67 thence runs on cable track 65, under sheave 70, up and over sheave 71 (Fig. 1A), down and around sheave 72, thence to the cable drum of a reversible electric winch 73. As can be seen in Fig. 10, this cable 67 extends onto the winding drum 74, extends for a plurality of turns about the drum and deadends at 75.

Cable 68 is deadended on rod 64, runs on cable track 63, thence extends under sheave 76, around sheave 77, thence down and around a sheave on the body corresponding to the sheave 72 but on the opposite side of the body, and thence to the winding drum 74. Cable 68 winds for a plurality of turns around the drum in an opposite direction from cable 67 and deadends at 78. It will be observed that winch 73 is a reversible winch and rotation of the drum 74 in opposite directions will impart pull on the cables 67 and 68 in opposite directions to rotate the elevator frame 50 about its vertical axis.

The carriage 80 comprises a pair of upright beams 81 and 82 (Fig. 2), joined at the top by a tie bar 83 and at the bottom by a tube 84, the tube, the tie bar and the beams forming an integral structure. A plate 85 joins the tie bar 83 and the tube 84 and serves to mount a sheave 86. The sheave 86 is also attached to a motor mount plate 87 which also reinforces the carriage, extending between the upright beams 81 and 82.

A means for raising and lowering the carriage is provided including a single pull cable 88 deadended on a hondo 89 mounted on pivot plate 58 of elevator frame 50. The cable 88 extends downwardly and around the sheave 86, up and around a sheave 90 which is supported from the crossbeam 16, thence to and around a sheave 91 and is thence threaded around additional sheaves to wind on an electric winch 92. Thus upon reversible rotation of the electric winch 92 the carriage may be raised and lowered in the elevator frame.

Saw boom assembly

A saw boom assembly 100 is mounted for vertical movement with the carriage and also for pivotal movement with the elevator frame about the vertical axis as described above. The saw boom assembly 100 comprises a sleeve 101 journalled inside the tube 84, and a saw supporting tongue 102 slidably mounted inside the sleeve. This sleeve 101 is an integral structure and as may be seen in Figs. 3, 4 and 5 is made up of an end bearing ring 103, a front cylinder 104, a center sleeve bearing ring 105, and a rear cylinder 106. The tube 84 has an outer bearing ring 107 at its saw end and an annular bolt ring 108 which also serves as an outer bearing. The center sleeve bearing ring 105 has an annular shoulder 109 thereon which is engaged by an annular lug 110 which receives bolts 111 to hold the sleeve in guided relation for movement inside the tube 84. Welded to the center sleeve bearing ring 105 is a spacer ring 112 having an annular channel 113 welded thereto. This annular channel 113 is thus rigid with the sleeve 101 and serves to provide a cable track for a pair of cables 114 and 115 oppositely wound thereon. These cables 114 and 115 are also oppositely wound on the winding drum 116 of a reversible electric winch 117, and upon rotation of the drum in opposite directions the sleeve may be turned one way or the other within the tube 84. The cable winding system between the winding drum 116 and the annular channel 113 may be the same as that shown in detail in my co-pending application entitled Constant Tension Cable Winding System, Serial No. 264,578, and filed January 2, 1952, now abandoned. A means for imparting sliding movement to the saw supporting tongue 102 is provided on one end of the sleeve 101 and comprises a reversible electric winch 120 having a drum surface 121 thereon.

This saw supporting tongue 102 is a box-shaped beam having two billets 122 and 123 (Fig. 1A) on each side thereof to form two tracks. Rollers 124 and 125 are journalled in spaced relation on the sleeve 101, and project inwardly to run on the track formed by billets 122 and 123. A pair of oppositely wound cables 126 and 127 are deadended on opposite ends of the drum 121 in a similar manner to that shown and described in connection with Fig. 10. The cable 126 extends off the drum, goes around sheave 128 thence inside the sleeve 101 and to a cable tightener 129 (Fig. 3) on the tongue 102 at one end thereof. The other cable 127 extends off the drum 121 and inside the sleeve 101 to and around the sheave 130 thence to a deadend 131 on the other end of the tongue 102. It can readily be seen that opposite rotation of the drum 121 will cause the cables to move the saw supporting tongue 102 in and out of the sleeve 101. The tongue 102 supports a motor driven power saw unit 135 which is bolted thereto and which includes a rotary saw blade 136.

Tree pusher arm

A tree pusher arm 140 is mounted on the rigid body of my mobile tree saw for longitudinal and transverse movement with respect to the mobile saw body. This tree pusher arm 140 may be a box beam having four billets 141 (Figs. 6 and 7) providing sliding surfaces. At the forward end of the tree pusher arm 140 is formed a tree engaging hook 142 which may be used to fell the tree forward, backward or sideways as desired.

The track 39 comprises a beam 143 having a plate 144 (Fig. 8) mounted thereon. A car 145 (Fig. 7) is mounted for transverse movement on the track 39 and comprises a U-shaped plate 146 having a pair of bolt plates 147 welded thereto. Bolted to the plates 147 are two guide members 148 having projecting portions 149 thereon to guide the car over the plate 144 of the track 39. The tree pusher arm 140 is slidably mounted inside the U-shaped plate 146 of the car, and the billets 141 of the pusher arm bear against this U-shaped plate 146 and against the bolt plates 147. The tree pusher arm 140 is slidably mounted at its other end in a U-shaped support member 150 which is mounted on the crossbeam 22. The notched portion of the support member 150 has sufficient clearance for the pusher arm to swing transversely of the track 39.

Means is provided in connection with the tree pusher arm for moving it in all directions horizontally to fell the tree forward, backward or sideways with respect to the rigid body of the mobile saw as may be desired. This means comprises cable systems arranged for imparting longitudinal sliding movement to the tree pusher arm and also movement transversely of the track 39. To effect the longitudinal sliding movement, a reversible electric winch 160 (Fig. 9) is mounted on mount plate 161 and has a drum surface on which are wound in opposite directions two cables 163 and 164 each deadended on the drum in the same manner as that shown in Fig. 10. The cable 163 extends off of the drum around the sheave 165 mounted on upright beam 8, up and around sheave 166, thence around sheave 167, and forward to a deadend rod 168 fixed on the pusher arm 140. The oppositely wound cable 164 extends off of the drum of winch 160 in a similar manner as cable 163, thence around sheaves 170 and 171 to deadend on the rod 172 of the cable tightening mechanism 173.

Transverse movement of the car 145 on the track 39 is controlled by another pair of cables 181 and 182 wound in opposite directions on another reversible electric winch 180 (Fig. 9) supported on the mount plate 161. These cables 181 and 182 are wound in the same manner as that shown in Fig. 10. Cable 181 extends off the drum of the reversible electric winch 180 around sheaves 183, 184, 185 and 186, thence thru and around opening 187 of the car 145 to a deadend 188. The other cable 182 extends off the drum of the reversible electric winch 180 in a similar manner, passes around a sheave (not shown) which is opposite sheave 183, thence around sheaves 189, 190, 191 to deadend on a rod 192 of a cable tightening mechanism 193, which is mounted on the traveling car 145. Thus it may be readily seen that rotation of the reversible electric winch 180 in opposite directions will cause transverse movement of the car 145 on the track 39 carrying the tree pusher arm 140 back and forth.

Steering

All four wheels of this mobile saw are steerable in the manner shown in Fig. 11 where the front wheels are shown. Each wheel is mounted on the rigid body in a manner identical to that shown in Fig. 12 in connection with the wheel 6. An upper wheel mounting arm 200 is welded to the upright beam 13 of the rigid body and serves to mount a downwardly extending ball 201. A lower wheel supporting arm 202 is welded to the cross plate 15 of the rigid body and serves to mount an upwardly extending ball 203 which is vertically aligned with the ball 201. The wheel 6 comprises a tire 204 carried on a rim structure 205 which is journalled on the drive shaft (not shown) of an electric motor and gear box 206 which furnishes power to the wheel. The electric drive of this wheel may be the same as that shown in my co-pending application entitled Electric Wheel, Serial No. 181,038 and filed August 23, 1950. Mounted on the rigid hub 207 of the electric motor and gear box 206 is a cup-shaped plate 208 which has a horseshoe-shaped ring 209 welded thereto. Upper and lower socket halves 210 and 211 are welded to this horseshoe-shaped ring 209 and have cooperating socket halves 212 and 213 removably attached thereto by bolts 214. The balls 201 and 203 are journalled inside of the upper and lower cooperating socket halves so that the wheel 6 is mounted for pivotal movement about a vertical axis. Bent portions 215 of the horseshoe-shaped ring 209 and a plate 216 together with an upstanding billet 217 form a link arm 218 on which is mounted a sheave housing 219 containing a sheave 220. The opposite wheel 7 has an identical but oppositely disposed structure having a link arm 221 for mounting a sheave housing 222 and sheave 223. A tie rod 224 connects the opposite link arms by means of the sheave housings 219 and 222 by virtue of pins 225 and 226. Structural beams 227 and 228 extend horizontally from the cross plate 15 and serve to mount a deadend rod 229 and a cable tightening mechanism 230.

The steering of the wheels 6 and 7 is controlled by a pair of cables 231 and 232 which are wound in opposite directions on the drum of a reversible electric winch 233 mounted on the mount plate 161 in a similar manner to that shown in Fig. 10. Each of the cables 231 and 232 extends forwardly over a group of guiding sheaves. As may be seen in Fig. 11, cable 231 continues forwardly to pass over sheave 234, down and around sheave 235, over sheave 236, around the link arm sheave 223 to deadend on the rod 229. The other cable 232 is threaded in a similar manner around sheave 237, down and around sheave 238, around sheave 239, thence around the link arm sheave 220 to deadend on a rod 240 of the cable tightening mechanism 230. It will be observed that rotation of the drum of the electric winch 233 in opposite directions will exert a pull on the cables 231 and 232 in opposite directions to impart steering to the wheels 6 and 7 by virtue of their link arms 221 and 218. One of the wheels 6 is shown in a steered position in the dotted line 6a, and the position of the link arm is shown dotted as 218a and the tie bar as 224a. Each of the other wheels will, of course, steer in a similar manner upon energization of the steering controlling winches. Reversible winch 241 controls the steering of the rear wheels in a similar manner to that described in connection with the front wheels.

*Summary of operation*

In operation the mobile saw may be driven to the desired location with respect to the trees or limbs to be worked on. Steering of all four wheels is accomplished by energization of reversible electric winches 233 and 241.

The elevator frame 50 may be rotated about its vertical axis by energizing the reversible electric winch 73. The carriage 80 and the saw boom assembly 100 may be raised and lowered upon reversible rotation of the electric winch 92. The sleeve 101 may be rotated within the tube 84 upon energization of reversible electric winch 117. The saw supporting tongue 102 may be moved in and out of the sleeve 101 by reversible rotation of the winch 120. With this combination of movements, the saw blade 136 can be positioned wherever desired.

Longitudinal and transverse movement can be imparted to the tree pusher arm 140 by energization of the reversible electric winches 160 and 180 as described above. With these movements, the direction of fall of the trees may be controlled.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A mobile saw comprising a wheel supported body; means supporting a power driven rotary saw on said body for movement substantially vertically, for movement horizontally forward and backward with respect to said vehicle, and for movement horizontally in an arc forwardly of said vehicle; a push beam mounted on said body above said saw for movement in all directions horizontally to engage a tree being cut to fell said tree forward, backward or sideways as desired; and power means associated with said push beam for selectively and forcibly imparting any of said movements thereto independently of movements of said saw.

2. A mobile saw comprising a wheel supported body; means supporting a power driven rotary saw on said body for movement substantially vertically, for movement horizontally forward and backward with respect to said vehicle, and for movement horizontally in an arc forwardly of said vehicle; a push beam mounted on said body above said saw for movement in all directions horizontally to engage a tree being cut to fell said tree forward, backward or sideways as desired; power means associated with said saw for imparting said movements thereof; and different power means associated with said push beam for selectively and forcibly imparting any of said movements thereto independently of movements of said saw.

3. A mobile tree saw comprising a rigid body supported by wheels, a power saw mounted on the body for longitudinal, vertical and transverse movement with respect to said body, a tree pusher arm mounted on said body for cooperation with said power saw, power means for selectively and forcibly actuating said pusher arm in either direction laterally with respect to said body and simultaneously in either direction longitudinally with respect to said body, whereby a resultant force in any horizontal direction may be applied by said pusher arm to a tree to positively control the felling direction of said tree, and laterally projecting means adjacent the end of said pusher arm arranged to selectively engage any selected side of a tree positioned forwardly of said body.

4. A mobile tree saw comprising a vehicle, a power saw mounted on said vehicle for longitudinal, vertical and transverse movement with respect to the vehicle, an elongated pusher arm, guide means guiding said arm for longitudinal sliding and for pivotal movement at one position on said vehicle, support means mounted for transverse movement on said vehicle at another position thereon spaced from said guide means, means on said support means for guiding said arm for longitudinal sliding thereon, and selectively operable power means for forcibly sliding said arm longitudinally in either direction and for forcibly moving said support means in either transverse direction on said vehicle independently of movements of said saw.

References Cited in the file of this patent

UNITED STATES PATENTS

| | | |
|---|---|---|
| 1,318,324 | Keon | Oct. 7, 1919 |
| 1,602,357 | Georgelis | Oct. 5, 1926 |
| 2,365,408 | Hillyer | Dec. 19, 1944 |
| 2,404,655 | Randall | July 23, 1946 |
| 2,426,694 | King | Sept. 2, 1947 |
| 2,461,589 | Crawford | Feb. 15, 1949 |
| 2,462,314 | Fuqua | Feb. 22, 1949 |
| 2,538,371 | Le Tourneau | Jan. 16, 1951 |
| 2,566,088 | Le Tourneau | Aug. 28, 1951 |